US010334640B2

(12) United States Patent
Ianev et al.

(10) Patent No.: US 10,334,640 B2
(45) Date of Patent: Jun. 25, 2019

(54) SYSTEMS, METHODS, AND DEVICES FOR FACILITATING WIRELESS COMMUNICATION

(71) Applicant: NEC Corporation, Tokyo (JP)

(72) Inventors: Iskren Ianev, Heidelberg (DE); Toshiyuki Tamura, Tokyo (JP); Genadi Velev, Heidelberg (DE); Andreas Kunz, Heidelberg (DE)

(73) Assignee: NEC Corporation, Tokyo (JP)

( * ) Notice: Subject to any disclaimer, the term of this patent is extended or adjusted under 35 U.S.C. 154(b) by 39 days.

(21) Appl. No.: 15/558,878

(22) PCT Filed: Dec. 21, 2015

(86) PCT No.: PCT/EP2015/080838
§ 371 (c)(1),
(2) Date: Sep. 15, 2017

(87) PCT Pub. No.: WO2016/146219
PCT Pub. Date: Sep. 22, 2016

(65) Prior Publication Data
US 2018/0077744 A1 Mar. 15, 2018

(30) Foreign Application Priority Data

Mar. 18, 2015 (EP) .................................. 15159695

(51) Int. Cl.
H04W 76/10 (2018.01)
H04W 88/14 (2009.01)
H04W 76/12 (2018.01)

(52) U.S. Cl.
CPC ............ H04W 76/12 (2018.02); H04W 88/14
(2013.01)

(58) Field of Classification Search
CPC .... H04W 88/14; H04W 64/003; H04W 76/10
See application file for complete search history.

(56) References Cited

U.S. PATENT DOCUMENTS 10,136,407 B2 * 11/2018 Kuge .................... H04W 60/04
2004/0162077 A1 * 8/2004 Kauranen ............. H04W 48/18
455/445

(Continued)

FOREIGN PATENT DOCUMENTS

JP       2006-518122 A     8/2006
RU         2 538 778       1/2012
WO    WO 2004/075576 A1   9/2004

OTHER PUBLICATIONS

Notice of Reasons for Refusal dated Aug. 1, 2018, and an English-language machine translation, issued by the Japanese Patent Office in counterpart Japanese Patent Application No. 2017-546857.

(Continued)

Primary Examiner — Robert C Scheibel
(74) Attorney, Agent, or Firm — Finnegan, Henderson, Farabow, Garrett & Dunner, L.L.P.

(57) ABSTRACT

A communication system is disclosed in which a base station receives, from a communication device, NAS signalling for establishing a connection via the base station. The base station forwards the NAS signalling to a default MME for setting up the connection to the default MME. The default MME sends, responsive to the base station forwarding the NAS said signalling, a message identifying an MME group to which the NAS signalling should be rerouted. The base station selects an MME based on the message identifying the MME group, and forwards the NAS signalling to the selected MME, and includes information indicating that the NAS signalling shall not be rerouted.

14 Claims, 6 Drawing Sheets

(56) References Cited

U.S. PATENT DOCUMENTS

| | | | |
|---|---|---|---|
| 2011/0269499 A1 | 11/2011 | Vikberg et al. | |
| 2013/0137438 A1 | 5/2013 | Serravalle et al. | |
| 2016/0050601 A1* | 2/2016 | Jeong | H04W 36/14 455/436 |
| 2016/0262068 A1* | 9/2016 | Won | H04W 36/0011 |

OTHER PUBLICATIONS

Official Action dated Apr. 24, 2018, issued by the Russian Patent Office in counterpart Russian Patent Application No. 2016151924/08(083187).

International Search Report dated Mar. 29, 2016, in corresponding PCT International Application.

3$^{rd}$ Generation Partnership Project; Technical Specification Group Services and System Aspects; Architecture Enhancements for Dedicated Core Networks; Stage 2, (Release 13), 3GPP TR 23.707, V13.0.0, pp. 1-39, (2014).

SA WG2 Meetings #17, 3GPP S2-150651, 56 sheets, (2015).

"3$^{rd}$ Generation Partnership Project; Technical Specification Group Services and System Aspects; General Packet Radio Service (GPRS) Enhancements for Evolved Universal Terrestrial Radio Access Network, (E-UTRAN) Access, (Release 13)", 3GPP TS 23.401, V13.1.0, pp. 1-310, (2014).

SA WG2 Meeting #107, 3GPP S2-150609, 44 sheets, (2015).

"3$^{rd}$ Generation Partnership Project; Technical Specification Group Services and System Aspects; General Packet Radio Service (GPRS), Service Description, Stage 2, (Release 13)", 3GPP TS 23.060, V13.1.0, pp. 1-354, (2014).

"3$^{rd}$ Generation Partnership Project; Technical Specification Group Services and System Aspects; General Packet Radio Service (GPRS) Enhancements for Evolved Universal Terrestrial Radio Access Network, (E-UTRAN) Access, (Release 13)", 3GPP TS 23.401, V13.4.0, pp. 1-334, (2015).

"3$^{rd}$ Generation Partnership Project; Technical Specification Group Services and System Aspects; Network Sharing, Architecture and Functional Description, (Release 13)", 3GPP TS 23.251, V13.1.0, pp. 1-39, (2015).

3GPP TSG-RAN3#89, "Dedicated Core Network (DÉCOR) Overview and RAN3 Specification Impact", R3-151607, pp. 1-6, (2015).

* cited by examiner

SYSTEMS, METHODS, AND DEVICES FOR FACILITATING WIRELESS COMMUNICATION

The present invention relates to a communication system. The invention has particular but not exclusive relevance to wireless communication systems and devices thereof operating according to the 3rd Generation Partnership Project (3GPP) standards or equivalents or derivatives thereof, such as the Universal Terrestrial Radio Access Network (UTRAN) and the Long Term Evolution (LTE) of UTRAN (E-UTRAN), including UE-Advanced. The invention has particular although not exclusive relevance to using a dedicated core network.

Under the 3GPP standards, a 'NodeB' (or an 'eNB' in LTE) is the base station via which mobile devices connect to a core network and communicate to other mobile devices or remote servers. In order to be able to do so, the mobile devices establish so called radio resource control (RRC) connection with a serving base station. For simplicity, the present application will use the term base station to refer to any such base stations. Communication devices might be, for example, mobile communication devices such as mobile telephones, smartphones, user equipment, personal digital assistants, machine type communication (MTC) devices, Internet of Things (IoT) devices, laptop computers, web browsers, and the like. 3GPP standards also make it possible to connect non-mobile user equipment to the network, such as Wi-Fi routers, modems, which can be implemented as a part of a (generally) stationary apparatus. For simplicity, the present application refers to mobile communication devices (or mobile devices) in the description but it will be appreciated that the technology described can be implemented on any mobile and "non-mobile" equipment that can connect to such a core network.

Under the 3GPP standards, base stations are coupled to a core network (referred to as an enhanced packet core (EPC) network in LTE). In order to keep track of the mobile devices and to facilitate movement between the different base stations, the core network comprises a number of mobility management entities (MMEs) which are in communication with the base stations coupled to the core network. Communication between the mobile devices and their associated MME is carried out using non-access stratum (NAS) signalling (via the serving base station). In some core networks, a serving GPRS support node (SGSN) may also be used instead of an MME, depending on the radio access technology (RAT) used by the mobile device.

Recent 3GPP standards (for example, LTE, and more recently LTE-Advanced, or 'LTE-A' standards) make it possible for User Equipment (UE), such as mobile devices to connect efficiently to the core network using dedicated core network nodes (such as dedicated MMEs/SGSNs). Details of this so-called 'Dedicated Core Network' (DECOR) feature have been discussed in 3GPP technical report (TR) 23.707 (V13.0.0), the contents of which are incorporated herein by reference. In summary, the DECOR feature enables a network operator to deploy multiple dedicated core networks (DCNs) within its network (along with a common (i.e. non-dedicated) core network). The objective of the DECOR feature is to enable the deployment of DCNs which are dedicated to subscribers (UEs) sharing the same or similar characteristics. Accordingly, each DCN may be dedicated to serve specific type(s) of subscribers and/or specific type(s) of services.

DCNs are optional and can be deployed, selectively, for various types of radio access technologies (RATS), such as GERAN (GSM EDGE Radio Access Network), UTRAN, and/or E-UTRAN. For example, a network operator may deploy dedicated MMEs (in order to support E-UTRAN) but no dedicated SGSNs (thus without supporting GERAN/UTRAN), or vice versa. The motivations for deploying DECOR might include, amongst others, the provision of DCNs with specific characteristics/functions or scaling, to isolate specific UEs or subscribers (e.g. machine-to-machine (M2M) subscribers, subscribers belonging to a specific enterprise or a separate administrative domain, subscribers belonging to a mobile virtual network operator (MVNO), etc.) from other UEs or subscribers, etc.

However, such different groups of customers and devices may have different requirements in terms of features, traffic characteristics, availability, congestion management, signalling and user plane data usage, and/or the like. DCNs comprising dedicated/specialised core network elements/resources can help operators meet the requirements of such groups of devices/customers. DCNs may also contribute to meeting network availability and/or redundancy requirements, and facilitates independent scaling or specific feature provisioning for specific user or traffic types and isolating various types of users and traffic from each other.

Each DCN comprises of one or more MME/SGSN and it may comprise one or more serving gateway (S-GW), packet data network (PDN) gateway (P-GW), and/or policy and charging rules function (PCRF), as appropriate. In the following description the term "dedicated core network"/"DCN" is used to cover one or more network functions comprising: (1) a control plane function such as an MME or an SGSN; (2) a user plane network function such as an S-GW, a P-GW, a gateway GPRS support node (GGSN); and (3) a set of control plane and user plane functions.

Each subscriber can be allocated to and served by a specific DCN based on their respective subscription information ("UE Usage Type") and/or operator configuration. Networks deploying DCNS may have a default DCN (or default core network nodes of a common core network) for managing UEs for which a DCN is not available and/or if sufficient information (e.g. an associated UE usage type parameter) is not available in order to assign a UE to a particular DCN. One or more DCNs may be deployed together with a default DCN (or default core network nodes) that all share the same RAN.

There is one UE Usage Type per subscriber, which requires no specific UE functionality, i.e. it works also with UEs conforming to earlier standard releases. Like in the case conventional MMES, it is possible to move UE context from one (source) MME/SGSN to another (target) MME/SGSN, for example, during handover, load balancing, initial network attachment, and/or the like. When an MME/SGSN supporting DCNs selects a target MME/SGSN for a UE, the selection of the target MME/SGSN is restricted to the same DCN (due to the UE usage type).

When in an area that supports DECOR (or when in an area where a DCN is deployed), each UE is initially allocated by its serving base station to an arbitrary/random or a default MME (regardless of UE usage type). The serving base station forwards the UE's NAS messages (at least the UE's initial NAS message) to the allocated MME. The allocated MME (which may also form part of a DCN) then determines (based on the associated UE usage type) whether that specific UE should be served by a different core network dedicated to that UE (i.e. a core network other than the one to which the allocated MME belongs).

When the currently allocated MME determines that a UE should be served by a different (dedicated) core network, it selects the appropriate DCN and requests the serving base station to reroute (redirect) the UE's NAS message to that DCN (associated with the same UE usage type as the UE). The currently allocated MME also includes in its rerouting request information identifying the MME (or SGSN) that belongs to the selected DCN. The serving base station, based on the information identifying the selected MME/DCN, selects a new MME using a so-called NAS node selection function (NNSF), and sends the UE's NAS message to the selected MME.

The current procedures and conditions for NAS message rerouting are defined in 3GPP change request no. S2-150651 (related to 3GPP technical specification (TS) 23.401 V13.1.0) and S2-150609 (related to 3GPP TS 23.060 V13.1.0). Rerouting to a dedicated network may be performed for the UE's initial attach, tracking area update (TAU), and routing area update (RAU) procedures.

For example, 3GPP TS 23.401, section 5.3.3.1 (as reflected in 32-150651) discloses the following possibilities for the default MME to trigger NAS message redirection during a TAU procedure:

In step 7: "if dedicated core networks are supported and the new MME does not serve UEs of the UE Usage Type value contained in the Context Response message, the MME sends a Context Acknowledge message indicating failure due to the wrong dedicated core network. The new MME uses the NAS message redirection procedure of clause 5.x.1 to redirect the TAU request message to a dedicated MME. The TAU procedure at the new MME terminates. The dedicated MME node continues the TAU procedure from Step 2 onwards."

It is noted that step 7 of section 5.3.3.1 in S2-150651 corresponds to step 2 of 3GPP TS 23.401 v13.4.0, sections 5.19.1 and 5.19.2.

In step 17: "The Subscription Data may contain a "UE Usage Type" value. If dedicated core networks are supported and the MME does not serve UEs of the particular "UE Usage Type", the new MME uses the NAS message redirection procedure of clause 5.x.1 to redirect the attach request message to dedicated MME node. The dedicated MME starts the TAU procedure from Step 2 but with the following differences in Steps 4 and 5. In Step 4, the dedicated MME sends the Context Request to the new MME which is selected based on the GUTI provided by the eNB during the re-route message and not based on the GUTI in the TAU request message. In Step 4 the new MME does not verify the integrity of the TAU Request message. The new MME responds with the Context Response message that includes security related information to the dedicated MME. The TAU procedure at the new MME terminates,"

It is noted that step 17 of section5.3.3.1 in S2-150651 corresponds to step 6 of 3GPP TS 23.401 v13.4.0, sections 5.19.1 and 5.19.2.

However, the inventors have realised that the present procedures for MME/SGSN (re)selection and/or NAS message rerouting for DECOR functionality are inefficient and may result in unnecessary signalling and/or inefficient service continuity for some UEs.

For example, in certain cases, it may not be possible (or it may require excessive signalling) to complete rerouting of a NAS message to a suitable dedicated node or function. This may happen, for example, if a particular type of DECOR (a particular UE Usage Type) is not supported in the network (or at least in a part of the network), even if DECOR functionality is otherwise supported (e.g. for some other UE Usage Types).

Specifically, when a UE associated with a particular UE usage type (or a particular type of DCN) attempts to register itself (initial registration via Attach or re-registration via TAU when entering a new MME Pool/Service area) with an MME by sending an appropriate NAS message, the UE's serving base station selects a default MME from a pool of MMEs available in that network (or in that part of the network). Upon determining the type of DECOR functionality required for that UE (based on an associated UE Usage Type which the default MME obtains either from the MME previously serving the UE or from the HSS), the default MME will attempt to reroute the NAS message to a dedicated MME corresponding to that UE usage type (e.g. by performing the actions specified in steps 7 and 17 above). However, if that particular UE Usage Type is not supported in the current MME pool (even if it was supported in the previous MME pool with which the UE was registered before), the base station will be unable to forward the NAS message to a dedicated MME and hence it is likely to proceed to select again the same (or another) default MME for the UE. In this case, the newly selected default MME will also attempt to reroute the NAS message to a dedicated MME corresponding to the UE usage type which would result in unnecessary signalling and/or possibly a 'ping-gong' signal exchange back and forth between the base station and the default MME (without succeeding in registering the UE in the network and/or without providing appropriate feedback to the UE sending the NAS message).

In such cases, therefore, rerouting/redirection of a particular NAS message to a dedicated core network may fail, which in turn may result in the network being unable to establish/maintain a service for the UE that has sent the NAS message.

Accordingly, preferred embodiments of the present invention aim to provide methods and apparatus which overcome or at least partially alleviate at least some of the above issues.

Although for efficiency of understanding for those of skill in the art, the invention will be described in detail in the context of a 3GPP system (UMTS, LTE), the principles of the invention can be applied to other systems in which mobile devices or User Equipment (UE) access the system using dedicated core network nodes.

In one aspect, the invention provides communication apparatus for a wireless communication system, the communication apparatus comprising: means for receiving, from a communication device, signalling for establishing a communication connection; means for sending signalling for setting up said communication connection to a first core network node; means for receiving, after sending said signalling for setting up said communication connection, from said first core network node, a message including information identifying a group of at least one core network node, to which said signalling for setting up said communication connection should be rerouted; means for selecting a core network node based on said message including information identifying a group of at least one core network nodes; and means for sending signalling for setting up said communication connection to said selected core network node, wherein said signalling includes information indicating that said signalling for setting up said communication connection shall not be rerouted.

In another aspect, the invention provides a core network node for a wireless communication system, the core network node comprising: means for receiving, from communication apparatus of said wireless communication system, signalling for setting up a communication connection for a communication device, wherein said signalling (e.g. initial UE message or UL-Unitdata message) includes information indicating that said signalling for setting up said communication connection shall not be rerouted.

Aspects of the invention extend to corresponding systems, methods, and computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

Embodiments of the invention will now be described, by way of example, with reference to the accompanying drawings in which.

OVERVIEW

Figure 1:
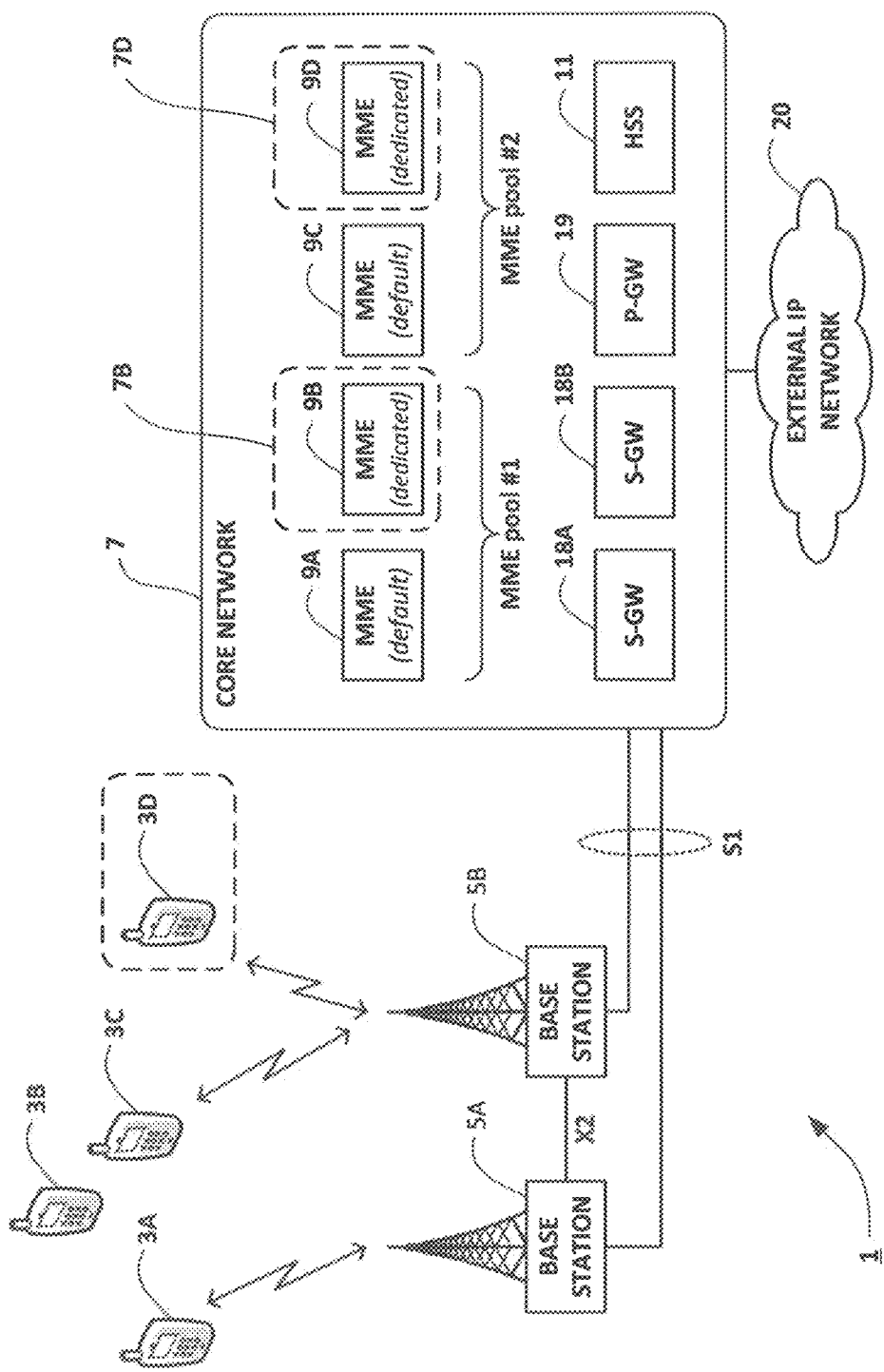
FIG. 1 illustrates schematically a cellular (tele)communication system to which embodiments of the invention may be applied.

FIG. 1 schematically illustrates a mobile (cellular or wireless) telecommunication network 1 in which users of mobile devices 3A to 3D can communicate with each other and other users via E-UTRAN base stations 5A, 5E and a core network 7 using an E-UTRA radio access technology (RAT). As those skilled in the art will appreciate, whilst four mobile devices 3 and two base stations 5 are shown in FIG. 1 for illustration purposes, the system, when implemented, will typically include other base stations and mobile devices.

As is well known, a mobile device 3 may enter and leave the areas (i.e. radio cells) served by the base stations 5 as the mobile device 3 is moving around in the geographical area covered by the telecommunication system 1. In order to keep track of the mobile device 3 and to facilitate movement between the different base stations 5, the core network 7 comprises a number of mobility management entities (MMEs) 9A to 9D, of which MMEs 9A and 9B are grouped together to form a first MME pool and MMEs 90 and 9D belong to a second, different MME pool. Although not shown in FIG. 1 for conciseness, it will be appreciated that the MME pools may comprise further MMEs, if appropriate.

In this example, MMEs 9A and 90 are common MMES (i.e. not associated with any specific UE usage type/mobile device 3 or associated with all UE usage types mobile devices 3) and MMEs 9B and 9D are dedicated MMEs (i.e. each of them is associated with one or more specific UE usage type(s)/mobile device(s) 3). Therefore, as shown, MME 9B forms part of a first dedicated core network portion (denoted '7B' in FIG. 1), MME 9D forms part of a second dedicated core network portion (denoted '7D'), whilst the remaining MMEs 9A and 90 form part of the main (or common) core network 7. Moreover, MMEs 9A and 90 are configured to act as default MMEs in their respective MME pool (e.g. for the mobile devices 3 that are newly connecting to the core network 7).

The MMEs 9 are in communication with the base stations 5 coupled to the core network 7. The core network 7 also comprises an HSS 11, and one or more gateways, such as serving gateways (S-GWs) 18A and 18B and/or at least one packet data network gateway (P-G) 19. It will be appreciated that each S-G) 18 may be associated with a respective MME pool (e.g. S-G 18A may be associated with the first MME pool and S-GW 18B may be associated with the second MME pool), although they may also be shared between several MME pools, if appropriate.

The mobile devices 3 and their respective serving base stations 5 are connected via are LTE air interface, the so-called "Uu" interface. The base stations 5 are connected to each other via a so-called "X2" interface. Each base station 5 is also connected to the core network 7 nodes (i.e. the MME 9 and the S-GW 18) via a so-called "S1" interface. From the core network 7, connection to an external IF network 20, such as the Internet, is also provided via the P-GW 19. Although not shown in FIG. 1, the MME 9 is also connected to the HSS 11 and the gateways 18, 19 via respective 3GPP interfaces.

Some of the mobile devices 3 may be associated with a particular dedicated core network (comprising at least a dedicated MME and/or a dedicated gateway). For example, the HSS 11 may be configured to store relevant subscription data for each mobile device 3, such as settings and subscription data required for the 3GPP subscriber to access the network 1, associated service type(s) and preferences, information identifying corresponding subscriber group(s), etc, based on which subscription data it is possible to identify an association between a particular mobile device 3 and a corresponding core network 7 (or 7B/7D). For those mobile devices (e.g. the mobile device 3D in FIG. 1) that are associated with a particular dedicated core network (e.g. the DCN 7B or 7D), the HSS 11 may also be configured to store information (and to provide this information to the default MME 9A) which can be used in the selection of an appropriate dedicated core network (dedicated MME) for the subscriber. Specifically, the HSS 11 may be configured to store for each subscriber (each mobile device 3) the subscription information parameter 'UE usage type' which can be used in the selection of an appropriate MME for that subscriber.

Initially, the base station 5B serving the mobile device 3D (since the base station 5B does not have information on whether or not the mobile device 3D needs to be registered with a dedicated core network) selects a default MME 9 for the mobile device 3D using NNSF (and/or the like) and forwards the NAB message sent by the mobile device 3D to the selected default MME 9. For example, the base station 5B may select a default MME (e.g. MME 9C) from the second MME pool to which the base station 5B is connected.

In this system, the subscription associated with the mobile device 3D has a UE usage type that corresponds to the UE usage type associated with a specific dedicated core network (e.g. DCN 7B or DCN 7D). Therefore, the core network 7 ensures that, whenever possible, the mobile device 3D is served by its associated dedicated core network (e.g. the mobile device 3D is registered with MME 9B/MME 9D that has the same UE usage type).

When the base station 5B serving the mobile device 3D (initially) selects an MME 9 (such as the default MME 9C in the second MME pool) that is not the correct MME for the mobile device 3D, then the default MME 9C can request the serving base station 5B to reroute the mobile device's 3D NAB message to the correct dedicated MME (identified by its associated MME group ID and/or the like).

In order to do so, the default MME 9C generates and sends a request (such as a Reroute NAS Message Request) to the base station 5B which forwarded that NAS message. The default MME 9C also includes in this request information for identifying the 'target' core network/MME to which the NAS message needs to be rerouted. For example, the information for identifying the core network/MME may comprise an MMEGI (for E-UTRAN) and/or a Null-NRI (for UTRAN and GPRS) corresponding to the MME/SGSN that belongs to the selected dedicated core network. It will be appreciated that the default MME may be configured with a mapping of MMEGI/Null-NRI to dedicated core network for the mobile device 3D and/or for a tracking area identifier (TAI) used by the mobile device 3D.

However, when the base station 5B serving the mobile device 3D is connected to an MME pool that does not support the specific UE usage type associated with the mobile device 3D (although the MME pool may still support DECOR functionality for other UE usage types), then the base station 5B is unable to reroute the NAS message to an MME having the correct UE usage type for this mobile device 3D. This may happen, for example, if the second MME pool to which the base station 5B is connected does not include any MME associated with the MMEGI (and/or any SGSN associated with the Null-NRI) indicated by the default MME 9C.

Thus, the base station 5B selects a default MME 9 again from its associated MME pool (for example, the same common MME 9C or a default dedicated MME, such as the MME 9D) that is not the correct MME for the mobile device 3D and forwards the NAS message to the newly selected MME. However, this time the base station 5B also includes in its message to the newly selected MME 9C/9D (along with the NAS message) information indicating that the MME 9C/9D should not attempt to reroute the NAS message. For example, this information may include an appropriate parameter (such as a flag and/or an information element) based on which the MME 9C/9D can determine that the NAS message has already been rerouted (and hence it refrains from attempting to reroute the NAS message again).

Beneficially, therefore, the newly selected MME 9C/9D (even though it is not the correct MME for that particular UE usage type/mobile device 3D), it will be able to deal with the NAS message in an appropriate manner (e.g. register the mobile device 3D with this MME or return an appropriate error message to the mobile device 3D indicating that the particular service requested by the mobile device 3D and/or the UE usage type is not supported via this MME pool).

In another beneficial example, instead of (or in addition to) using information provided by the base station 5B (e.g. such as a flag or an information element) when forwarding the NAS message, the default MME 9C may be configured to determine whether or not it should attempt to reroute a particular NAS message based on other criteria. For example, the default MME 9C may rely on its mapping of MMEGI/Null-NRI to dedicated MMES (in the current MME pool) and/or the UE usage type for the mobile device 3D (that the MME 9C may obtain from the HSS 11 and/or from an MME 9 previously serving the mobile device 3D) in its determination whether or not it should attempt to reroute a particular NAS message. In this case, the default MME 9C may be configured to attempt re-routing the NAS message to a dedicated core network only if it can determine that there is a dedicated MME in this MME pool that is associated with the same UE usage type as the mobile device 3D. On the other hand, if the default MME 9C determines that there is no suitable dedicated MME in this MME pool that is associated with the same UE usage type as the mobile device 3D (or it cannot determine that such dedicated MME is provided), then the default MME 9C may be configured not to reroute the NAS message and to attempt to register the mobile device 3D (and/or respond to the NAS message).

Advantageously, in both examples, it is possible to prevent unnecessary rerouting of NAS messages (e.g. Initial Attach, TAU, and/or RAU request messages) from the default MME when a dedicated MME corresponding to the mobile device's UE usage type is not available (at least in the current MME pool). This in turn may result in a considerable signalling reduction between the serving base station and the MME(s) and also avoids potential ping-pong type message exchange between the default (new) MME and the base station whilst attempting to reroute a NAS message.

Mobile Device

Figure 2:
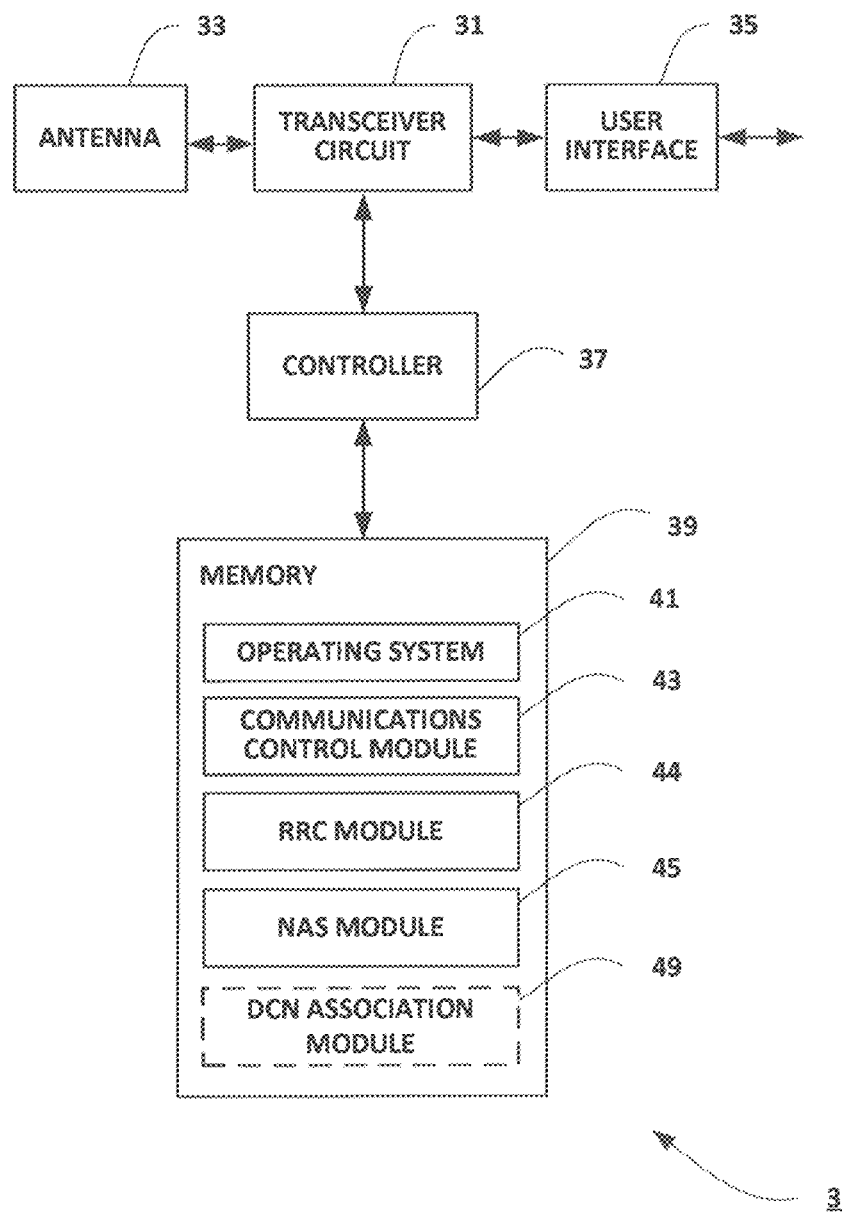
FIG. 2 is a block diagram of a mobile device forming part of the system shown in FIG. 1.

FIG. 2 is a block diagram illustrating the main components of one of the mobile devices 3 shown in FIG. 1. As shown, the mobile device 3 has a transceiver circuit 31 that is operable to transmit signals to and to receive signals from a base station 5 via one or more antenna 33. The mobile device 3 has a controller 37 to control the operation of the mobile device 3. The controller 37 is associated with a memory 39 and is coupled to the transceiver circuit 31. Although not necessarily shown in FIG. 2, the mobile device 3 will of course have all the usual functionality of a conventional mobile device 3 (such as a user interface 35) and this may be provided by any one or any combination of hardware, software and firmware, as appropriate. Software may be pre-installed in the memory 39 and/or may be downloaded via the telecommunication network or from a removable data storage device (RMD), for example.

The controller 37 controls overall operation of the mobile device 3 by, in this example, program instructions or software instructions stored within memory 39. As shown, these software instructions include, among other things, an operating system 41, a communications control module 43, an RRC module 44, a NAS module 45, and a dedicated core network association module 49 (optional).

The communications control module 43 controls the communication between the mobile device 3 and the base station 5. The communications control module 43 also controls the separate flows of control data and user data (for uplink and downlink) that are to be transmitted to the base station 5 and other nodes (via the base station 5) such as the MME 9 and/or the S-GW 18.

The RRC module 44 is operable to generate, send and receive signalling messages formatted according to the RRC standard. For example, such messages are exchanged between the mobile device 3 and its serving base station 5. The RRC messages may include, for example, messages relating to the random access procedure and/or the RRC messages comprising control data (e.g. NAS messages) to be relayed by the serving base station 5 to the MME 9.

The NAS module 45 is operable to generate, send and receive signalling messages formatted according to the NAS protocol. For example, such messages are exchanged (via the base stations 5) between the mobile device 3 and the MMES 9. The NAS messages may include, for example, the NAS messages comprising control data relating to mobility of a mobile device 3. e.g. control data for registering the mobile device 3 with an MME 9.

When present, the dedicated core network association module 49 stores information about a dedicated core network associated with this mobile device 3. For example, the dedicated core network association module 49 may store information identifying the associated DCN in the form of a globally unique temporary identifier ('GUTI'), a UE usage type parameter, a DCN type parameter, a DCN ID parameter, an MME/SGSN ID parameter (e.g. MMEGI), and/or the like.

Base Station

Figure 3:
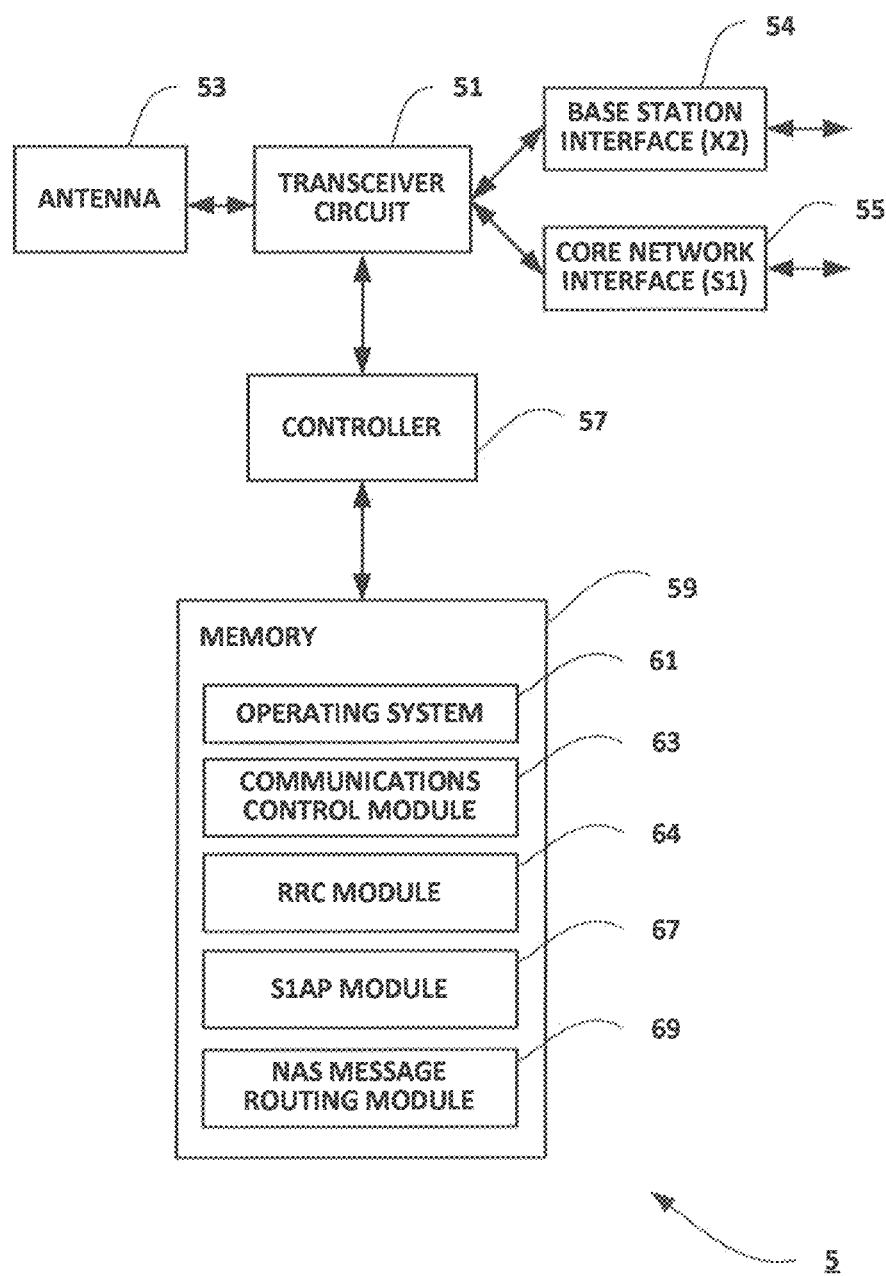
FIG. 3 is a block diagram of a base station forming part of the system shown in FIG. 1.

FIG. 3 is a block diagram illustrating the main components of one of the base stations 5 shown in FIG. 1. As shown, the base station 5 has a transceiver circuit 51 for transmitting signals to and for receiving signals from the mobile devices 3 via one or more antenna 53, a base station interface (X2) 54 for transmitting signals to and for receiving signals from other base stations, and a core network interface (S1) 55 for transmitting signals to and for receiving signals from the core network entities (e.g. the MMEs 9 and the S-GW 18). The base station 5 has a controller 57 to control the operation of the base station 5. The controller 57 is associated with a memory 59. Although not necessarily shown in FIG. 3, the base station 5 will of course have all the usual functionality of a cellular telephone network base station and this may be provided by any one or any combination of hardware, software and firmware, as appropriate. Software may be pre-installed in the memory 59 and/or may be downloaded via the communication network 1 or from a removable data storage device (RMD), for example. The controller 57 is configured to control the overall operation of the base station 5 by, in this example, program instructions or software instructions stored within memory 59. As shown, these software instructions include, among other things, an operating system 61, a communications control module 63, an RRC module 64, an S1AP module 67, and a NAS message rerouting module 69.

The communications control module 63 controls the communication between the base station 5 and the mobile devices 3 and other network entities (e.g. the MMES 9) that are connected to the base station 5. The communications control module 63 also controls the separate flows of uplink/downlink user traffic and control data for the mobile devices 3 associated with this base station 5 including, for example, control data for rerouting NAS messages.

The RRC module 64 is operable to generate, send and receive signalling messages formatted according to the RRC standard. For example, such messages are exchanged between the base station 5 and the mobile devices 3 that are associated with this base station 5. The RRC messages may include, for example, the RRC messages comprising control data (e.g. NAS messages) for relaying between the mobile device 3 and its serving MME 9.

The S1AP module 67 is operable to generate, send and receive signalling messages formatted according to the S1 application protocol (S1AP) standard. For example, such messages are exchanged between the base station 5 and the MMEs 9 connected to this base station 5. The S1AP messages may include, for example, messages relating to rerouting of NAS signalling (such as Reroute NAS message requests), S1 setup messages, and associated responses.

The NAS message routing module 69 is responsible for selecting an appropriate MME (or SGSN) for connected mobile devices and for (re)routing NAS messages to appropriate dedicated core networks (via the S1AP module 67). In the absence of an appropriate dedicated core network node (e.g. when an MME SGSN corresponding to a particular UE usage type is not provided in the MME pool connected to this base station), the NAS message routing module 69 ensures that no unnecessary rerouting attempt is made for NAS messages by mobile devices with that particular UE usage type. In order to do so, the NAS message routing module 69 provides (either explicitly or implicitly) information to the selected MME/SGSN based on which the MME/SGSN can determine whether or not it is allowed to reroute a particular NAS message to another MME/SGSN.

Mobility Management Entity

Figure 4:
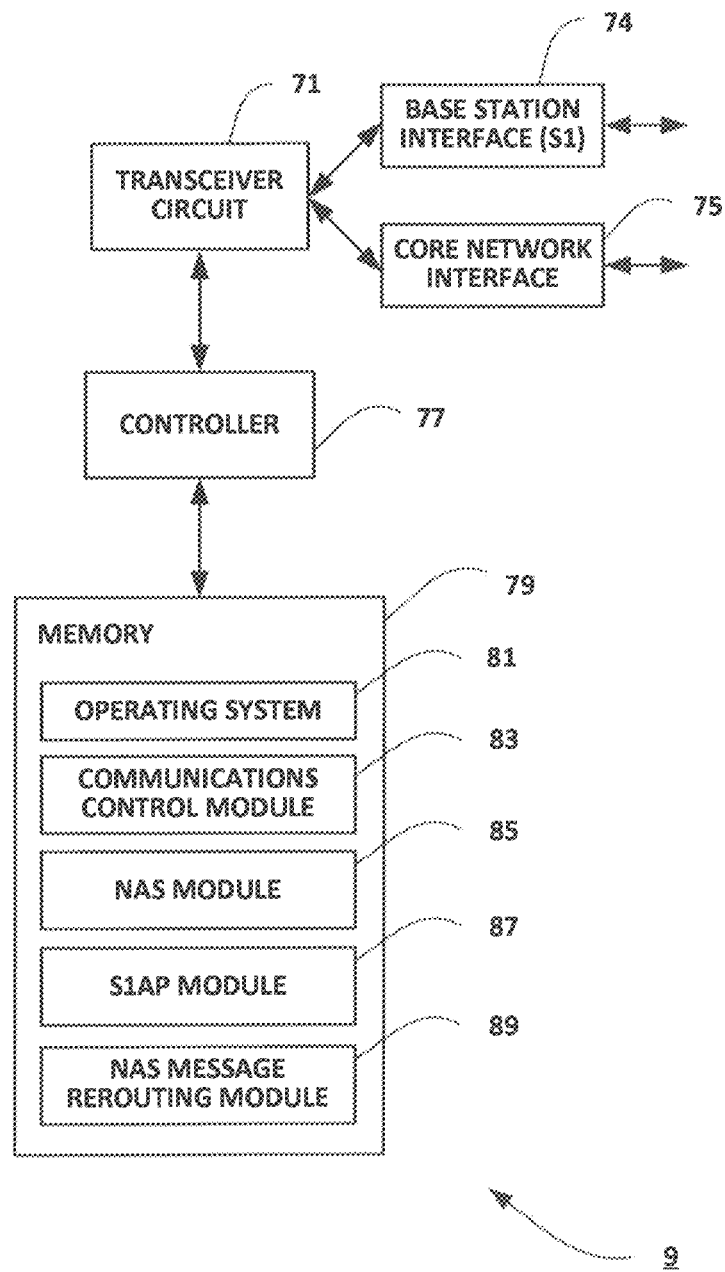
FIG. 4 is a block diagram of a mobility management entity forming part of the system shown in FIG. 1.

FIG. 4 is a block diagram illustrating the main components of one of the MMEs 9 shown in FIG. 1. As shown, the MME 9 has a transceiver circuit 71, a base station interface (S1) 74 for transmitting signals to and for receiving signals from the base stations 5, and a core network interface 75 for transmitting signals to and for receiving signals from other core network nodes (such as other MMEs 9 and the HSS 11). The MME 9 has a controller 77 to control the operation of the MME 9. The controller 77 is associated with a memory 79.

Software may be pre-installed in the memory 79 and/or may be downloaded via the communication network 1 or from a removable data storage device (RMD), for example. The controller 77 is configured to control the overall operation of the MME 9 by, in this example, program instructions or software instructions stored within memory 79. As shown, these software instructions include, among other things, an operating system 81, a communications control module 83, a non-access stratum module 85, an S1AP module 87, and a NAS message rerouting module 89.

The communications control module 83 controls the communication between the MME 9 and other network entities that are connected to the MME 9 (e.g. the base stations 5, other MMES 9, the HSS 11, and any mobile devices 3 when connected to one of the base stations 5).

The NAS module 85 is operable to generate, send and receive signalling messages formatted according to the NAS protocol. For example, such messages are exchanged (via the base stations 5) between the MME 9 and the mobile devices 3 that are associated with this MME 9. The NAS messages may include, for example, the NAS messages comprising control data relating to mobility of a mobile device 3, e.g. control data for registering the mobile device 3 with the MME 9.

The S1AP module 87 is operable to generate, send and receive signalling messages formatted according to the S1 application protocol (S1AP) standard. For example, such messages are exchanged between the MME 9 and the base stations 5 connected to this MME 9. The S1AP messages may include, for example, messages relating to rerouting of NAS signalling (such as Reroute NAS message requests), S1 setup messages, and associated responses.

The NAS message rerouting module 89 is responsible for rerouting each mobile device 3 attempting to register with this MME 9 to a different (e.g. dedicated) MME (or SGSN) appropriate for that mobile device (e.g. if the UE usage type associated with a particular mobile device 3 does not match the UE usage type associated with this MME 9). In order to do so, the NAS message rerouting module 89 stores information whether the MME 9 is associated with a particular DCN and information identifying that DCN (for example, in the form of a MMEGI and/or CN type and/or UE usage type). The NAS message rerouting module 89 also stores information whether neighbouring MMEs/SGSNs (e.g. in the same MME pool) are associated with any UE usage type, DCN, and/or mobile device. The NAS message rerouting module 39 provides this information to other modules, for example, the S1AP module 87 for use in rerouting NAS messages (e.g. selecting an appropriate target MME or MME group) and/or the NAS module 85 for deciding whether or not to register a particular mobile device 3. In some embodiments, the NAS message rerouting module 89 obtains (either explicitly or implicitly) an indication from the base station forwarding a NAS message based on which indication it can determine whether or not the MME 9 is allowed to reroute that particular NAS message to another MME/SGSN.

In the above description, the mobile device 3, the base station 5, and the MME 9 are described for ease of understanding as having a number of discrete modules (such as the communications control modules, the RRC/NAS modules, and the S1AP modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

A number of different embodiments will now be described that illustrate how different aspects of the invention can be put into effect using the above mobile device 3, base station 5, and MME 9. The embodiments will be described with reference to the signalling (or 'timing') diagrams shown in FIGS. 5 and 6.

Operation—First Embodiment

Figure 5:
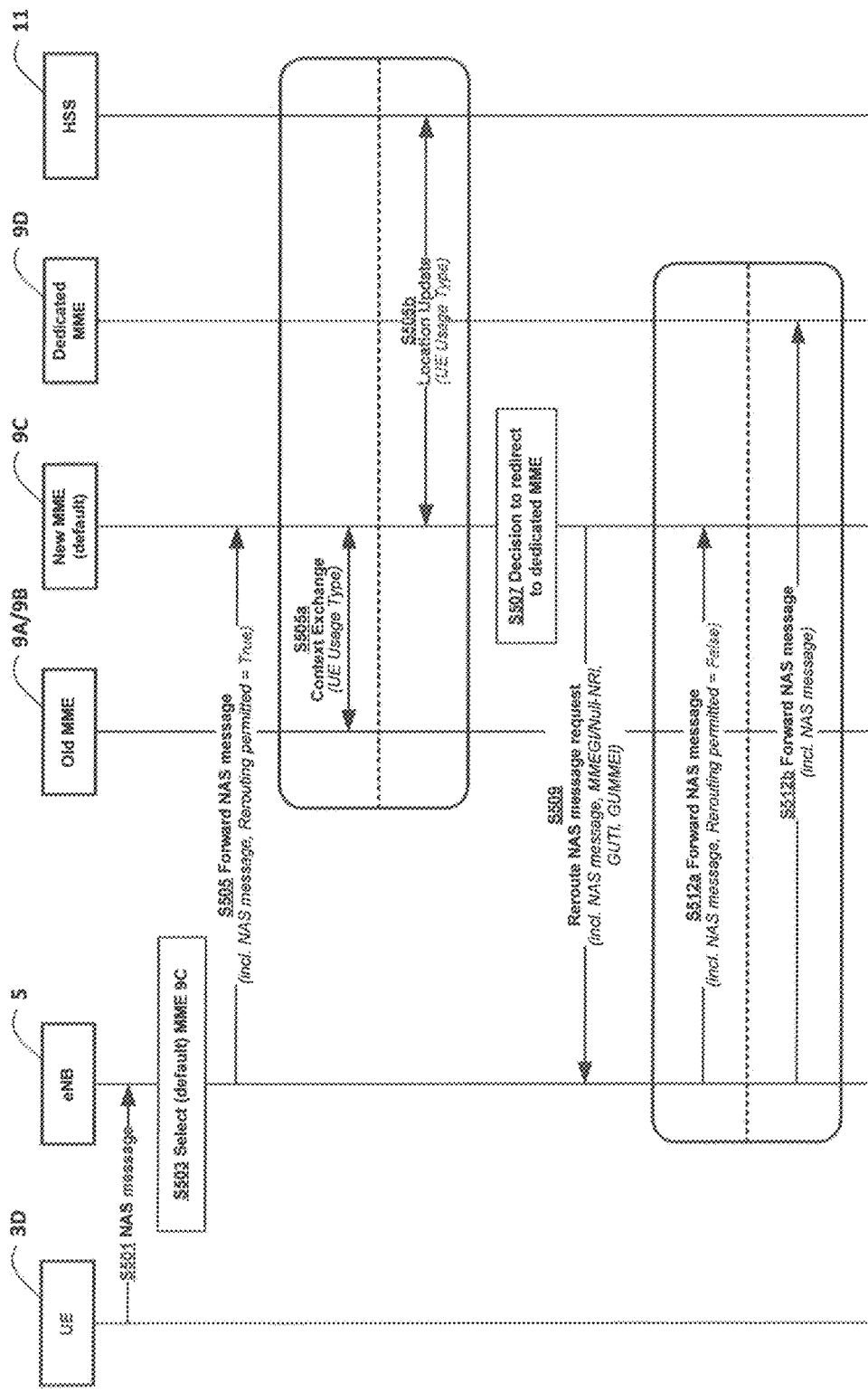
FIGS. 5 and 6 are timing diagrams indicating exemplary procedures for implementing some embodiments of the present invention.

FIG. 5 illustrates an exemplary timing diagram indicating a procedure for rerouting a NAS message. Specifically, in this example, the base station 5 (denoted 'eNB') serving the mobile device 3D indicates to the selected MME 9 whether or not the rerouting is permitted.

Although not shown in FIG. 5, the base station 5 initially establishes (using its S1AP module 67) respective S1 connections with some (or all) MMES 9 in its associated MME pool (in this example, the MME pool comprising MME 9C and MME 9D).

The procedure begins with the mobile device 3D generating (using its NAS module 45) and sending, in step S501, an appropriately formatted NAS message to its serving base station 5 (for relaying the NAS message to an appropriate MME 9). The NAS message may comprise an attach request, a tracking area update (TAU), a routing area update (RAU), and/or the like. The mobile device 3D (using its RRC module 44) embeds this NAS message in a suitable RRC message and sends this RRC message to the serving base station 5 (after performing an appropriate random access procedure, if necessary).

Upon receipt of this NAS message, the serving base station 5 selects, in step S503, an MME 9 from its MME pool for the mobile device 3D (in this example, the default MME 9C as the base station 5 does not have information about the mobile device's DCN type/subscription). For example, the base station 5 may perform an appropriate NNSF procedure. In step S505, the base station 5 (using its RRC module 64) takes the NAS message from the received RRC message and forwards the NAS message to the selected (default) MME 9C (e.g. by embedding the NAS message in an appropriately formatted S1 message).

It will be appreciated that the base station 5B may be configured to add to the forwarded NAS message a so-called 'Decor Reroute' flag (and/or any other flag/indication/information element that serves the same or similar purpose) in order to indicate to the selected MME 9 whether or not rerouting to a dedicated networks shall be considered. In this example, since it is the first time this particular NAS message is forwarded to an MME, the base station 5B indicates that rerouting is allowed (e.g. by setting an appropriate parameter/indication/flag in the message at step S505). However, it will also be appreciated that the base station 5B may be configured to indicate implicitly that rerouting is allowed (e.g. by not including any information to the contrary).

The default MME 9C receives the base station's 5 message and obtains information relating to the mobile device 3D that has sent the NAS message. The obtained information may comprise a UE context (at least a UE usage type) associated with that mobile device 3D. As generally illustrated in step S505a, the MME 9C may obtain this information during a context exchange procedure from another MME (an MME that the mobile device 3D was previously registered with). For example, a UE usage type value associated with the mobile device 3D may be included in a Context Response message sent by the 'old' MME if the mobile device 3D has a subscription for any specific dedicated network(s). It will be appreciated that such a context exchange procedure may be performed based on a GUTI used by the mobile device 3D (e.g. in the NAS message), based on which the default MME 9C may be able to identify and contact the old MME. Alternatively, as generally illustrated in step S505b, the MME 9C may obtain subscription data (including the UE context/UE Usage Type) associated with the mobile device 3D during a location update procedure from the HSS 11. It will be appreciated that such a location update procedure may be performed if the mobile device 3D did not include a valid GUTI in the NAS message (and hence the default MME 9C cannot identify and contact the old MME for obtaining the user context).

In either case, if the UE Usage Type associated with the mobile device 3D does not match the UE Usage Type associated with the default MME 9C, then the MME 9C decides to attempt to reroute the NAS message to an appropriate dedicated MME (as generally shown in step S507). Therefore, the default MME 9C generates (e.g. using its S1AP module 87) and sends, in step S509, an appropriately formatted message requesting the serving base station 5 to reroute the NAS message (sent by the mobile device 3D) to another MME (corresponding to the UE Usage Type for that mobile device 3D). In this example, the MME 9C generates and sends a 'Reroute NAS Message Request' to the base station 5 that forwarded the NAS message.

As shown in FIG. 5, this Reroute NAS message request includes: the original (unmodified) NAS message from the mobile device 3D; information identifying a reroute parameter (e.g. an MME group identifier ('MMEGI') and/or a 'Null-NRI' to which the NAS message needs to be rerouted); a globally unique temporary identifier ('GUTI') associated with the mobile device 3D. It will be appreciated that the MME 9C may be configured to obtain and store (e.g. in its NAS message rerouting module 89) information identifying a mapping of MMEGI/Null-NRI to dedicated core network/core network type (e.g. per tracking area), and select an appropriate MMEGI/Null-NRI based on this mapping. It will also be appreciated that the base station 5 is able to select a new MME (or a new SGSN) corresponding to the MMEGI/Null-NRI, for example, using NNSF functionality.

Next, the base station 5 (using its NAS message routing module 69) checks whether there is any MME in its pool that corresponds to the MMEGI/Null-NRI parameter (provided by the default MME 9C in step S509). Thus, depending on whether or not a suitable dedicated MME is found, the base station 5 has two options (shown in steps S512*a* and S512*b*, respectively).

If the UE usage type associated with the mobile device 3D is not supported by any MME in the MME pool that the base station 5 is connected to (although it may be supported in another MME pool), then the base station proceeds to step S512*a*.

In this case, the base station 5 selects the MME 9C that has sent the Reroute NAS Message Request (or performs an appropriate MME selection procedure, e.g. using NNSF, to select a different default MME, if any) and forwards the NAS message to the newly selected MME 9C (e.g. by embedding the NAS message in an appropriately formatted S1 message).

Advantageously, the serving base station 5 also includes in its message to the newly selected MME 9C (along with the NAS message) information indicating that the NAS message is a rerouted message and/or that the MME 9C shall not attempt to reroute the NAS message. Accordingly, the MME 9C will not attempt to reroute the NAS message again upon determining that the NAS message has already been rerouted. In this case, the selected default MME 9C may beneficially attempt to serve the mobile device 3D even though the UE usage type for that mobile device 3D does not match the UE usage type (if any) for the default MME 9C. Depending on operator configuration policy (if appropriate), the default MME 9C may also be configured to perform any other specific action in order to ensure that the mobile device 3D can register with the core network.

However, if the UE usage type associated with the mobile device 3D is supported by an MME (e.g. the dedicated MME 9D) in the MME pool that the base station 5 is connected to, then the base station proceeds to step S512*b*, in which it forwards the NAS message to the correct dedicated MME 9D in the current MME pool. It will be appreciated that the base station 5 is able to select/identify the correct dedicated MME 9D based on the MMEGI (for E-UTRAN) associated with that MME 9D (and/or select/identify the correct dedicated SGSN based on the Null-NRI (for UTRAN and GPRS) associated with that SGSN). Although not shown in FIG. 5, it will be appreciated that the message at step S512*b* may also include information indicating that the NAS message is a rerouted message and/or that the MME 9D should not attempt to reroute the NAS message (if appropriate).

Beneficially, by setting an appropriate 'Rerouting permitted' flag to 'False' in its message to the selected MME (and/or by providing any other suitable indication to this effect), the base station is able to indicate that rerouting shall be avoided as a dedicated network corresponding to that particular UE usage type is not supported.

Operation—Second Embodiment

Figure 6:
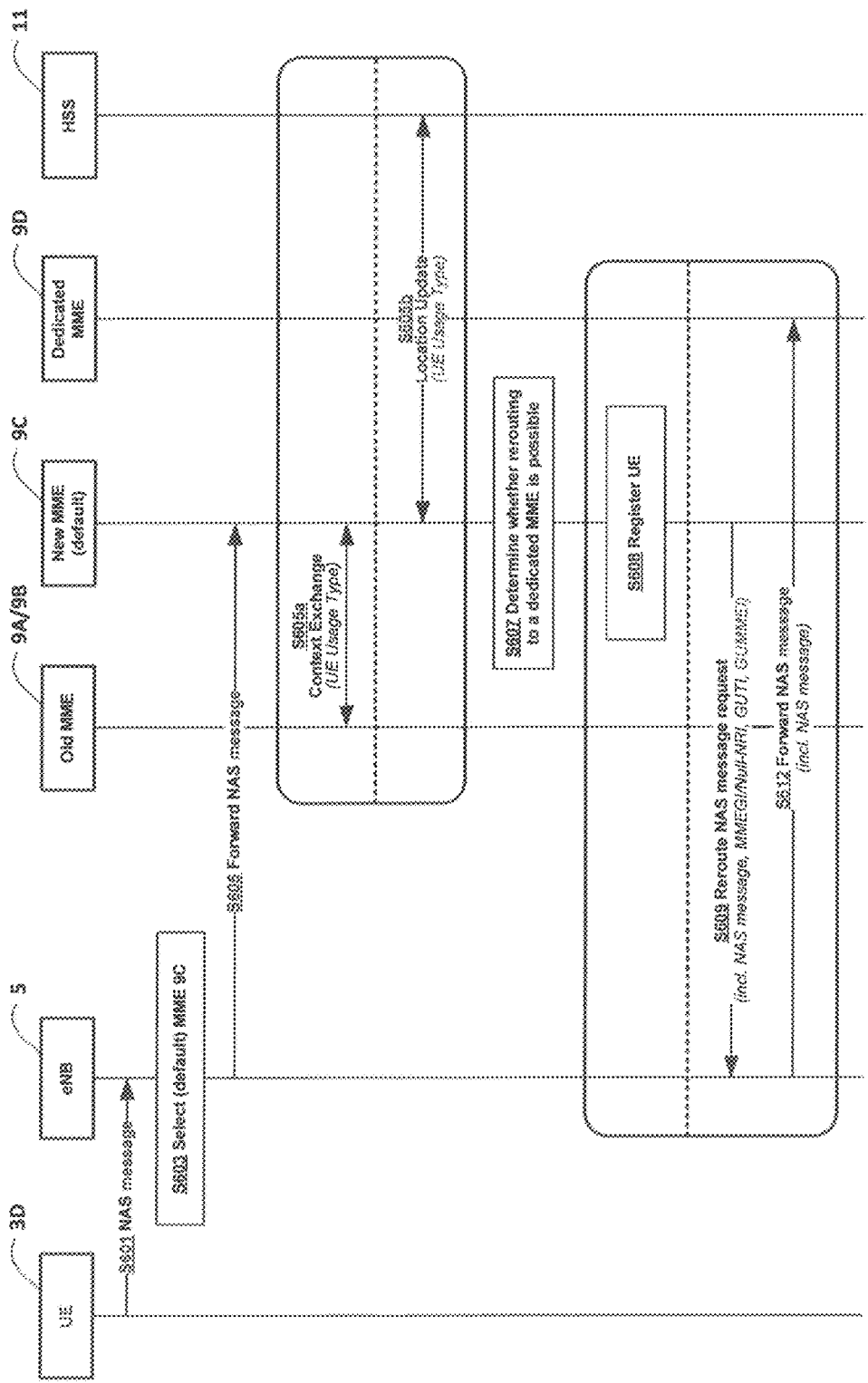

FIG. 6 illustrates an exemplary timing diagram indicating a procedure for rerouting a NAS message. Specifically, in this example, the default MME determines whether or not the rerouting is possible.

Steps S601 to S505*b* correspond to steps S501 to S505*b* of FIG. 5, respectively, thus their description is omitted here for simplicity.

However, in this example, the default MME 9C is beneficially configured to obtain information about what types of dedicated networks (what UE usage types) are supported in its MME pool so that the default MME 9C is able to determine whether or not a dedicated network of the UE usage type for the mobile device 3D is supported. Accordingly, based on this information, the default MME 9C is able to reroute the NAS message to the right dedicated network (if appropriate).

For example, the information about the types of dedicated networks supported in the MME pool (and/or by specific MMEs) may be configured by the network operator (e.g. via an Operations, Administrations and Management (DAM) system and/or other appropriate network configuration tool or means available to the network operator). Moreover, the information about the types of dedicated networks supported in the MME pool may be exchanged between the MMEs over the so-called 'S10' interface provided between them.

Thus, in step S607, the MME 9C (using its NAS message rerouting module 89) checks whether there is any MME in its pool that corresponds to the UE usage type associated with the mobile device 3D. Thus, depending on whether or not a suitable dedicated MME is found, the MME 9C has two options (shown in step S608 and steps S609-S612, respectively).

If the UE usage type associated with the mobile device 3D is not supported by any MME in the MME pool that the default MME 9C belongs to, then the default MME 9C proceeds to step S608, and attempts to serve the mobile device 3D even though the UE usage type for that mobile device 3D does not match the UE usage type (if any) for the default MME 9C. Depending on operator configuration policy (if appropriate), the default MME 9C may also be configured to perform any other specific action in order to ensure that the mobile device 3D can register with the core network.

However, if the UE usage type associated with the mobile device 3D is supported by an MME (e.g. the dedicated MME 9C) in the MME pool that the default MME 9C belongs to, then the default MME 9C proceeds to step S609, in which it requests rerouting for the NAS message. As shown in FIG. 6, the message sent at step S609 corresponds to the message sent in step S509 of FIG. 5, thus it will not be described in detail.

It will be appreciated that the base station 5 receiving the Reroute NAS message request at step S609 is able to select a dedicated MME (or a dedicated SGSN) corresponding to the MMEGI/Null-NRI, for example, using NNSF functionality. Accordingly, the base station 5 (using its NAS message routing module 69) selects an MME in its pool that corresponds to the MMEGI/Null-NRI parameter (in this example, MME 9D), and forwards, in step S612, the NAS message to the selected dedicated MME 9C. Finally, the dedicated MME 9C (if available) starts serving the mobile device 3D (and/or returns an appropriate NAS response).

Beneficially, in this example, it is possible to avoid any rerouting attempt if a corresponding dedicated MME is not provided for a particular UE usage type. In other words, by employing improved criteria, the default MME may be configured to reroute the NAS message only if it can determine that an appropriate dedicated MME is provided in its MME pool. If no dedicated networks are supported in this MME pool or a dedicated network of the correct UE usage type is not supported or not available, the default MME can attempt to serve the mobile device at once (instead of rerouting the NAS message first).

Modifications and Alternatives

Detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

In the above embodiments, the mobile devices are cellular telephones. It will be appreciated that the above embodiments could be implemented using devices other than mobile telephones such as, for example, personal digital assistants, laptop computers, web browsers, etc. The above embodiments are applicable to non-mobile or generally stationary user equipment as well.

In the above description of the embodiments, the exemplary network nodes are base stations and MMEs. However, it will be appreciated that a radio network controller (RNC) may be used instead of the (LTE) base station and an SGSN may be used instead of the MME.

The above embodiments have been described using an MME for illustrative purposes only and in no way shall be considered limiting the invention to require an MME and/or a LTE core network. For example, an SGSN may be used instead of an MME. In this case, an appropriate SGSN group identifier (or a Null-NRI) may be used instead of the MMEGI described in steps S509 and S609 above. It will also be appreciated that an RNC may be used instead of the base station. Embodiments of the invention are applicable to systems according to other (3GPP and/or non-3GPP) standards as well in which user equipment is required to connect to dedicated network nodes.

In the above embodiments, the serving base station is described to forward the NAS message from the mobile device to the selected MME. It will be appreciated that the serving base station may forward the NAS message using an appropriately formatted S1 message, for example, a so-called 'Initial UE message' and/or the like.

In the above description of the first embodiment, the serving base station indicates to the selected default MME whether or not the NAS message can be rerouted (e.g. it indicates that a NAS massage should not be rerouted in case of an appropriate dedicated MME/SGSN in not provided in the network). However, it will be appreciated that the base station (or another network node, e.g. HSS, OAM, etc) may also be configured to indicate that a particular NAS message should not be rerouted, depending on operator configuration, even if an appropriate dedicated MME/SGSN in provided in the network. Such operator configuration may be applied per user/UE/UE usage type/MMEGI/MME etc.

In the above description of the first embodiment, the serving base station is described to forward the NAS message from the mobile device to the selected MME and include appropriate information for indicating to the default MME that the NAS message should not be (or cannot be) rerouted to an appropriate dedicated MME. However, it will also be appreciated that instead of forwarding the NAS message to the same MME the base station may send a different message (e.g. 'Reroute Reject' message and/or any other appropriately formatted signalling message) to the MME in order to indicate that the NAS message should not be (or cannot be) rerouted and/or that rerouting to a dedicated network of that UE usage type is not possible.

It will be appreciated that the old (default) and the new (dedicated) MME/SGSN may be physically separated (e.g. provided at different locations) or they may be co-located at the same location (although provided as logically separate entities).

It will be appreciated that the above embodiments may also be applied to heterogeneous/partial DCN deployments, when a DCN is deployed only for some RATs (but not all) and/or only for a specific area (tracking/routing area) within the network. In this case, the base station and the MME may be configured to take into account whether the mobile device is inside or outside the specific service area and/or RAT that supports the DCN functionality (for that mobile device).

It will be appreciated that the above described NAS message redirection (and/or MME/SGSN re-selection) might also be carried out for load balancing purposes (e.g. for moving subscribers from an MME/SGSN having an overload or an MME/SGSN having a relatively high load to another MME(s)/SGSN(s) having a relatively low load).

In the above embodiments, a number of software modules were described. As those skilled in the art will appreciate, the software modules may be provided in compiled or un-compiled form and may be supplied to the base station or the MME as a signal over a computer network, or on a recording medium. Further, the functionality performed by part or all of this software may be performed using one or more dedicated hardware circuits. However, the use of software modules is preferred as it facilitates the updating of the base station, the MME, and the mobile device in order to update their functionalities.

The message including information identifying a group of at least one core network node may comprise information identifying at least one dedicated mobility management entity (MME) and/or at least one dedicated SGSN of a type corresponding to that of the communication device that sent said signalling for establishing a communication connection.

The signalling for establishing a communication connection may comprise a non-access stratum (NAS) message (e.g. an attach request message, a tracking area update message, or a routing area update message).

The signalling (e.g. Initial UE message or UL-Unitdata message) for setting up said communication connection to a first core network may include information indicating that said signalling for setting up said communication connection shall not be rerouted. The signalling (e.g. Initial UE message or UL-Unitdata message) for setting up said communication connection to a first core network may include information indicating that said signalling for setting up said communication connection can be rerouted.

The plurality of core network nodes may comprise a plurality of mobility management entities (MMEs) and/or serving GPRS support nodes (SGSNs). In this case, the first core network node may comprise a default MME or a default SGSN. The communication apparatus may comprise at least one of: a base station and a radio network controller (RNC).

The information indicating that said signalling for setting up said communication connection shall not be rerouted may comprise at least one of: an information element (e.g. an information element identifying said group of at least one core network nodes) and an indication on whether rerouting is permitted or not.

The selecting means of said communication apparatus may be operable to select said default core network node (e.g. using a NAS node selection function) based on at least one of: an MME group identifier (MMEGI), a network resource identifier (e.g. 'Null-NRI'), a serving GPRS support node (SGSN) group identifier, and a globally unique temporary identifier (GUTI).

The message including information identifying a group of at least one core network nodes may comprise a Reroute NAS message request.

When rerouting said signalling for setting up said communication connection to said default core network node, the sending means of said communication apparatus may be operable to send, to said default core network node, at least one of: a 'reroute NAS message reject' message, a 'forward NAS message' message, and an 'initial UE message'.

The core network node may also comprise means for sending, to said communication apparatus, after said receiving means receiving said signalling for setting up said communication connection as a default core network node, a message including information identifying a group of at least one core network nodes, to which said signalling for setting up said communication connection should be rerouted.

The core network node may be configured to set up said communication connection between said core network node and said communication device upon said receiving means receiving said signalling for setting up said communication connection to said core network node.

The core network node may comprise a mobility management entity (MME) or a serving GPRS support node (SGSN).

Various other modifications will be apparent to those skilled in the art and will not be described in further detail here.

ABBREVIATIONS eNB evolved Node B
E-UTRAN Evolved Universal Terrestrial Radio Access Network
GGSN Gateway GPRS Support Node
GPRS General Packet Radio Service
GUTI Globally Unique Temporary Identity
HSS Home Subscriber Server
MME Mobility Management Entity
MMEGI MME Global Identity
NAS Non Access Stratum
NNSF NAS Node Selection Function
NRI Network Resource Identifier
PCRF Policy and Charging Rules Function
PGW Packet Data Network Gateway
RAU Routing Area Update
RNC Radio Network Controller
SGSN Serving GPRS Support Node
SGW Serving Gateway
TAU Tracking Area Update
UE User Equipment
UTRAN UMTS Terrestrial Radio Access Network

The invention claimed is:

1. A communication method of a radio access network node in a wireless communication system, the communication method comprising:
receiving, from a communication device, a first message for establishing a communication connection;
sending the first message to a first core network node;
receiving, from the first core network node, a second message including information identifying a group of at least one core network node;
selecting a second core network node based on the second message; and
sending a third message including the first message to the second core network node,
wherein the third message includes Information indicating that the first message shall not be rerouted, and
wherein the information identifying a group of at least one core network node is the information indicating that the first message shall not be rerouted.

2. The communication method according to claim 1, wherein the group comprises a dedicated core network of at least one core network node, the dedicated core network corresponding to a type of the communication device that sends the first message.

3. The communication method according to claim 1, wherein
the selecting the second core network node Is performed based on at least one of:
a Mobility Management Entity (MME) group identifier (MMEGI);
a network resource identifier (NRI);
a Serving General packet radio service Support Node (SGSN) group identifier; and
a globally unique temporary identifier (GUTI),
included in the second message.

4. The communication method according to claim 1, wherein the second message includes a Reroute Non Access Stratum (NAS) message request.

5. The communication method according to claim 1, wherein the sending the third message is performed by sending, to the second core network node, at least one of:
i) a 'reroute Non Access Stratum (NAS) message reject' message,
ii) a 'forward NAS message', and
iii) an 'initial User Equipment (UE) message'.

6. The communication method according to claim 1, wherein the second core network node comprises at least one of the first core network node and a core network node within a default dedicated core network.

7. A communication method of a core network node in a wireless communication system, the communication method comprising:
receiving a third message from a radio access network node of the wireless communication system, the third message including a first message for establishing a communication connection for a communication device and information Indicating that the first message shall not be rerouted,
wherein the information indicating that the first message shall not be rerouted is information identifying a group of at least one core network node.

8. The communication method according to claim 7, further comprising:
receiving the first message from the communication device; and
sending, after receiving the first message, to the radio access network node, a second message including the information Identifying a group of at least one core network node, wherein
the receiving the third message is after the sending the second message.

9. The communication method according to claim 8, further comprising registering the communication device to a core network upon receiving the third message.

10. A communication method for a communication device configured to communicate with a radio access network node, comprising:
sending, to the radio access network node, a first message for establishing a communication connection to cause the radio access network node to send the first message to a first core network node, wherein:

a request message including the first message and information Indicating that the first message shall not be rerouted is sent to a second core network node, and the information Indicating that the first message shall not be rerouted is information identifying a group of at least one core network node.

11. A radio access network node in a wireless communication system, comprising:
a receiver configured to receive, from a communication device, a first message for establishing a communication connection;
a transmitter configured to send the first message to a first core network node;
a further receiver configured to receive, from the first core network node, a second message including information identifying a group of at least one core network node; and
at least one processor configured to process to select a second core network node based on the second message, wherein:
the transmitter is further configured to send a third message including the first message to the second core network node,
the third message includes information indicating that the first message shall not be rerouted, and
the information identifying a group of at least one core network node is the information indicating that the first message shall not be rerouted.

12. A core network node in a wireless communication system, comprising:
a receiver configured to receive a third message from a radio access network node of the wireless communication system, the third message including a first message for establishing a communication connection for a communication device and information indicating that the first message shall not be rerouted,
wherein the information indicating that the first message shall not be rerouted is information identifying a group of at least one core network node.

13. A system comprising the radio access network node according to claim 11; and the core network node according to claim 12.

14. A communication device, comprising:
at least one processor configured to:
communicate with a radio access network node; and
send, to the radio access network node, a first message for establishing a communication connection to cause the radio access network node to send the first message to a first core network node, wherein;
a request message including the first message and Information indicating that the first message shall not be rerouted is sent to a second core network node, and
the information Indicating that the first message shall not be rerouted is information identifying a group of at least one core network node.

\* \* \* \* \*

UNITED STATES PATENT AND TRADEMARK OFFICE
CERTIFICATE OF CORRECTION

PATENT NO. : 10,334,640 B2
APPLICATION NO. : 15/558878
DATED : June 25, 2019
INVENTOR(S) : Iskren Ianev et al.

Page 1 of 1

It is certified that error appears in the above-identified patent and that said Letters Patent is hereby corrected as shown below:

In the Claims

Claim 3, Column 18, Line 11, "Is performed" should read as --is performed--.

Claim 8, Column 18, Line 54, "Identifying" should read as --identifying--.

Claim 10, Column 19, Line 2, "Indicating" should read as --indicating--.

Claim 10, Column 19, Line 4, "Indicating" should read as --indicating--.

Claim 11, Column 19, Line 19, "configured to process to select" should read as --configured to select--.

Claim 14, Column 20, Line 20, "wherein;" should read as --wherein:--.

Claim 14, Column 20, Line 22, "Information" should read as --information--.

Claim 14, Column 20, Line 26, "Indicating" should read as --indicating--.

Signed and Sealed this
Twenty-fourth Day of September, 2019

Andrei Iancu
*Director of the United States Patent and Trademark Office*